United States Patent Office 2,934,513
Patented Apr. 26, 1960

2,934,513

MODIFIED POLYESTERS

Darrell D. Hicks and John E. Masters, Louisville, Ky., assignors to Devoe & Raynolds Co., Inc., a corporation of New York No Drawing. Application September 17, 1956
Serial No. 610,402

9 Claims. (Cl. 260—45.4)

This invention pertains to new polyesters and to their preparation. More particularly, the invention relates to phenol-modified polyester resins.

Phenol-modified polyesters have been made by mixing a low molecular weight phenol condensate in a drying oil acid with a polyester. Phenol-modified polyesters have also been prepared by mixing a phenol resin with phthalic acid and glycerin to form the polyester in the presence of the phenol resin. However, unless drastic conditions are employed, the phenol resin is merely in admixture with the polyester and not chemically combined therewith.

In accordance with this invention, a method is provided for the production of phenol-modified polyesters, wherein the phenol enters the reaction and becomes part of the polyester chain; yet extreme reaction conditions are not employed. By the practice of this invention phenol-modified polyesters are prepared from anhydrides, monoepoxides and dihydric phenols. A dibasic acid anhydride and a monoepoxide, if pure, will not react. A monoepoxide will, however, react quite readily with a phenolic hydroxyl group or a carboxyl group even at temperatures below esterification temperatures. A dibasic acid anhydride, on the other hand, will react with an alcoholic hydroxyl, also at relatively low temperatures, to form a half ester. Hence, since anhydrides and monoepoxides will not react with each other, the reaction for the preparation of these modified polyesters is initiated by the reaction of monoepoxide with dihydric phenol to form alcoholic hydroxyls which in turn react with anhydride, thereby providing carboxyl groups for further reaction with additional monoepoxide. The phenolic compound thus becomes a part of the polyester.

By the practice of an embodiment of this invention, therefore, dicarboxylic acid anhydrides and monoepoxides form polyester chains joined to a dihydric phenol, the reaction being initiated by the dihydric phenol. Among desirable dihydric phenols are mononuclear phenols such as resorcinol, catechol, pyrocatechol, quinol, orcinol, dihydroxy xylol, and mesorcinol. Particularly advantageous are polynuclear phenols having two phenolic hydroxyl groups as their sole reactive groups such as dihydroxy diphenyl methanes, their isomers, their homologs, and their substituted compounds. Included are bis(4-hydroxyphenyl)-2,2-propane (bisphenol), 4,4'-dihydroxybenzophenone, bis(4-hydroxyphenyl)-1,1-ethane, bis(4-hydroxyphenyl)-1,1-isobutane, bis(4-hydroxyphenyl)-2,2-butane, bis(4-hydroxy-2-methylphenyl)-2,2 - propane, bis(4-hydroxy-2-tert-butylphenyl)-2,2-propane, bis-(2-hydroxynaphthyl)methane, and 1,3-dihydroxy naphthalene. Other dihydric phenols contemplated by this invention are compounds containing two benzene nuclei attached to each other directly or through other atoms of atom groups, for example, —($CH_2$)$_n$—, —$SO_2$—, —O—, —CO—, and —$CR_2$—, and having two phenolic hydroxyl groups as their sole reactive groups, R being an alkyl, cyclohexyl, or phenyl group. High molecular weight dihydric phenols are important where a greater degree of phenolic modification is desired. Suitable for this purpose are condensation products of phenols with acetone, such as 4,4'-dimethyl-2,2'-dihydroxy-diphenyl-dimethylmethane, phenol aldehyde condensates made from two mols of a monohydric phenol with one mol of an aldehyde such as the dihydroxy diphenyl methanes, condensates prepared from bisphenol and phenol-epoxide condensates such as the product of two mols of bisphenol with one mol of epichlorhydrin, as well as 1,1-bis(4-hydroxyphenyl)-4-tertiary-amyl cyclohexane, 1,1-bis(4-hydroxyphenyl)decahydronaphthalene, 4-cyclohexyl-1,2-dihydroxy benzene, and 4-(alpha-phenyl isopropyl)resorcinol.

In the preparation of the polyester resins of this invention the three reactants are combined and reacted under conditions sufficiently mild to bring about the phenol-epoxide reaction, and subsequent carboxy-epoxy reaction, yet not sufficiently high to bring about a carboxyl-alcoholic hydroxyl or esterification reaction which would result in the formation of water. This temperature generally does not exceed 150° C. and is desirably maintained in the range of 115° C. to 130° C.

In carrying out this invention it is generally desirable to melt the mixture of dibasic acid anhydride and phenol, heat the mixture to a temperature of 120° C. to 130° C., and to slowly add monoepoxide while maintaining the reaction mixture at 120° C. to 130° C. until there is no change in acid value. As the polyester is formed there is a progressive reduction in acid number. In many instances, acid values of one to ten are obtained, indicating substantially complete reaction and a product approaching the theoretical. In other instances, for example, where very high molecular weight products are being prepared, acid values as high as twenty to fifty result. In the case of low boiling monoepoxides, rather than taking acid numbers, it is convenient to judge the reaction by reflux. After all of the low boiling monoepoxide has been added, the temperature is raised as reflux permits, to approximately 150° C., and this temperature is maintained until reflux ceases, indicating that monoepoxide has been consumed. Of course, if a higher boiling monoepoxide is employed, that is, one having a boiling point above 140° C. to 150° C., no reflux will be observed. In some instances, particularly in the case of high molecular weight dihydric phenols, it is desirable to employ an inert catalyst, tertiary amines being suitable for the purpose.

Monoepoxides within the contemplation of this invention are epoxy compounds having three-membered epoxide rings and free of substituents capable of reacting with an acid anhydride group. Included is oxirane, or ethylene oxide, as well as the alkyl oxiranes, for example, methyl oxirane or propylene oxide, butene-2-oxide, etc. Among others are ethers and esters containing only one three-membered epoxide substituent, each free of other groups capable of reacting with the anhydride group of an acid anhydride. Examples are phenyl glycidyl ether, isopropyl glycidyl ether, glycidyl benzoate, butyl glycidyl ether, allyl glycidyl ether, glycidyl acrylate, a glycidyl methacrylate, glycidyl crotonate, glycidyl acetate, etc. Referring to unsaturated monoepoxides, some degree of selection must be exercised. Thus, allyl glycidyl ether or glycidyl acrylate should not be used with maleic acid anhydride or a cross-linked product results. Hence, a monoepoxide containing a double bond desirably is not employed with an unsaturated acid anhydride. It is preferred to employ an unsaturated acid anhydride with a saturated monoepoxide.

Dicarboxylic acid anhydrides applicable to this invention include both aliphatic and aromatic dicarboxylic acid anhydrides, either saturated or unsaturated, for example, succinic, adiphic maleic, glutaric, phthalic, isosuccinic, and sebacic anhydrides, naphthalene dicarboxylic acid anhydrides, etc. Endo-cis-bicyclo-(2,2,1)-5-heptene-2,3-dicarboxylic anhydride (sold under the trademark "Nadic" anhydride), and 1,4,5,6,7,7-hexachlorobicyclo-(2,2,1)-5-heptene-2,3-dicarboxylic anhydride (sold under the trademark "Chlorendic" anhydride) are also desirable.

In the preparation of the polyesters of this invention only a small amount of initiator is used in proportion to the monoepoxide and dibasic acid anhydride since the more dihydric phenol used, the lower the molecular weight of the polymer will be. The ratio of reactants to dihydric phenol, therefore, depends upon the desired size of the molecule. Proportions are not vital since a wide variety of molecular weight polyesters can be prepared. When it is desired to have more phenol in a high molecular weight modified polyester a higher molecular weight phenol is used, such as the cresol-acetone condensates, etc., described hereinbefore. Inasmuch as anhydride and monoepoxide molecules add to the dihydric phenol, polyesters can be made having molecular weights approximately equal to any desired molecular weight. The proportions of reactants to give a linear polyester of a theoretical molecular weight can be calculated, and when these proportions are used, a polyester can be prepared which has a molecular weight corresponding approximately with the calculated theoretical molecular weight. The theoretical molecular weight is calculated as the molecular weight of the dihydric phenol plus the sum of the molecular weights of each additional reactant times the number of mols of each reactant per mol dihydric phenol. In the light of these considerations, the amount of monoepoxide and dibasic acid anhydride to be reacted in the presence of the dihydric phenol can be readily determined by one skilled in the art. As a general statement, it can be said that the molar ratio of anhydride to monoepoxide is in the range of $n:n$ to $n:n+2$ where $n$ is a number representing the number of mols of anhydride, and the molar ratio of anhydride plus monoepoxide to dihydric phenol is greater than 4:1. A ratio of $n:n$, theoretically, results in a carboxy terminated product while $n:n+2$ gives an alcoholic hydroxyl terminated compound.

For further understanding of the invention reference is made to the following specific examples. These examples are intended to be illustrative of the invention only, since different embodiments can be made without departing from the invention.

*Example 1*

To prepare a thermoplastic polyester resin having a theoretical molecular weight of 3356, propylene oxide, bisphenol, phthalic anhydride and maleic anhydride are employed in a mol ratio of 22 to 1 to 8 to 8. The bisphenol (79.2 grams), maleic acid anhydride (271.2 grams), and phthalic acid anhydride (409.2 grams) are heated together in a two liter, three neck, round bottom flask equipped with an agitator, thermometer, dropping funnel, and Dry Ice condenser. The flask contents are heated to 120° C. and held at this temperature for fifteen minutes, after which time the propylene oxide (440.4 grams) is added to the reaction mixture drop-wise, by means of the dropping funnel, at a rate sufficient to maintain heavy reflux at 120° C., approximately fifteen hours. When all of the propylene oxide is added, and the reflux diminishes, the temperature of the reaction mixture is increased to 150° C., as reflux permits, and is held at this temperature until reflux ceases, approximately thirty minutes. The volatiles are distilled off at reduced pressure, around 15 mm. Hg, at 150° C. The resulting polyester resin has an acid value of 47.3, a viscosity of U to V (Gardner-Holdt) at 66.7 percent solids in styrene and a color of 12–13 at 66.7 percent solids in styrene.

The polyester resin of this example (180.0 grams), 120 grams of styrene containing five hundred parts per million tertiary butyl catechol and six grams of catalyst, a paste of fifty percent benzoyl peroxide and fifty percent tricresyl phosphate, are blended together. From this blend, a 3/16 inch casting formed between two glass plates, using a curing schedule of one hour at 75° C. plus an additional two hours at 121° C., has the following properties:

Tensile strength _____p.s.i__ 2200
Flexure strength _____p.s.i__ 2600
Impact strength _____ft. lb./inch of notch__ 0.28
Rockwell alpha-hardness _____ 57
Elongation at break _____percent__ 45

*Example 2*

A thermoplastic polyester resin with a theoretical molecular weight of 1794 is prepared by reacting together propylene oxide, bisphenol, maleic anhydride and phthalic anhydride in a mol ratio of eleven to one to four to four. The bisphenol (148 grams), maleic acid anhydride (254.3 grams), phthalic acid anhydride (384 grams) and propylene oxide (414.4 grams) are reacted together following the procedure of Example 1, the addition of propylene oxide requiring approximately eleven hours. After completion of the reaction and distilling off the volatile material at reduced pressure, the resulting polyester resin has an acid value of 44, of color of 8–9 at 66.7 percent solids in styrene and a viscosity of T to U (Gardner-Holdt) at 66.7 percent solids in styrene.

Using a curing schedule as set forth in Example 1, a 3/16 inch, flexible, soft, non-tacky, thermoset casting is formed between two glass plates from a blend of the polyester of this example (180 grams) with 120 grams of styrene containing five hundred parts per million tertiary butyl catechol using six grams of catalyst, a paste of fifty percent benzoyl peroxide and fifty percent tricresyl phosphate.

*Example 3*

A thermoplastic polyester resin having a theoretical molecular weight of 1676, is prepared by employing propylene oxide, resorcinol, maleic anhydride and phthalic anhydride in a mol ratio of eleven to one to four to four. In accordance with the procedure outlined in Example 1, resorcinol (75.6 grams), maleic acid anhydride (271.2 grams), phthalic acid anhydride (410.4 grams) and propylene oxide (442.8 grams) are reacted together, the drop wise addition of propylene oxide requiring approximately 8½ hours. The polyester resin resulting, after distilling off the volatiles under reduced pressure (8 to 9 mm. Hg) has an acid value of 47.3, a viscosity of U to V (Gardner-Holdt) at 66.7 percent solids in styrene, and a color of 12–13 at 66.7 percent solids in styrene.

Using the cure schedule of Example 1, a soft, flexible, non-tacky, thermoset, 3/16 inch casting is formed between two glass plates from a blend of 180 grams of the polyester resin of this example, with 120 grams of styrene containing five hundred parts per million of tertiary butyl catechol using six grams of catalyst, a paste of fifty percent benzoyl peroxide and fifty percent tricresyl phosphate.

The preceding examples illustrate a method of preparing phenolic-modified polyesters, wherein the phenol is a reactant; and yet the process does not require extreme reaction conditions. The examples also show that polyesters are prepared which can be subsequently cured, for example, with vinyl monomers, to give desirable castings and pottings. When desired, polyesters having recurring double bonds can be prepared by the use of maleic or other unsaturated dibasic acid anhydrides.

Because phenol-modified polyesters can be prepared in accordance with this invention having widely varying physical properties, polyesters are suitable for decorative, industrial, and maintenance finishes, adhesives, cable and wire coatings, laminates, molded plastic articles and the like. Plasticizers, pigments, dyes, reinforcing agents, and similar materials commonly used in formulating polymeric compositions can be used with the polyesters of this invention. Since such variations will occur to those skilled in the art, it is obvious that these embodiments are within the scope of this invention.

What is claimed is:

1. A process for the production of thermoplastic polyesters which comprises concomitantly reacting, a monoepoxide, a dihydric phenol and a dicarboxylic acid anhydride at an elevated temperature below which water of esterification is formed, said dihydric phenol being selected from the group consisting of mononuclear and polynuclear phenols, said monoepoxide being selected from the group consisting of oxirane, alkyl oxiranes, and ethers and esters containing only one three-membered epoxide substituent, each free of substituents capable of reacting with an acid anhydride group, the molar ratio of dicarboxylic acid anhydride to monoepoxide being from $n:n$ to $n:n+2$ where $n$ represents the number of mols of anhydride, and the molar ratio of anhydride plus monoepoxide to dihydric phenol being greater than 4:1.

2. The process of claim 1, wherein the monoepoxide is propylene oxide, wherein the dihydric phenol is 2,2-bis(4-hydroxyphenyl)propane, and wherein the dicarboxylic acid anhydride is maleic acid anhydride.

3. The process of claim 1, wherein the monoepoxide is butene-2-oxide, wherein the dihydric phenol is dihydroxy naphthalene, and wherein the dicarboxylic acid anhydride is phthalic acid anhydride.

4. The process of claim 1, wherein the monoepoxide is phenyl glycidyl ether, wherein the dihydric phenol is resorcinol, and wherein the dicarboxylic acid anhydride is a mixture of maleic and phthalic acid anhydrides.

5. The process of claim 1, wherein the monoepoxide is butyl glycidyl ether, wherein the dihydric phenol is dihydroxy-diphenyl-methane and wherein the dicarboxylic acid anhydride is maleic acid anhydride.

6. The product resulting from the process of claim 1.

7. The product resulting from the process of claim 2.

8. The product resulting from the process of claim 4.

9. An insoluble, infusible film-forming composition resulting from the heat reaction of the product of claim 6 with styrene, the styrene comprising from thirty to sixty weigh percent of the film-forming composition.

References Cited in the file of this patent

UNITED STATES PATENTS

| | | |
|---|---|---|
| 2,324,483 | Castan | July 20, 1943 |
| 2,607,761 | Seymour | Aug. 19, 1952 |
| 2,634,251 | Kass | Apr. 7, 1953 |
| 2,675,367 | Caldwell | Apr. 13, 1954 |